US010212257B2

(12) United States Patent
Teodorescu et al.

(10) Patent No.: US 10,212,257 B2
(45) Date of Patent: Feb. 19, 2019

(54) PERSISTENT QUERY DISPATCH AND EXECUTION ARCHITECTURE

(71) Applicant: Deephaven Data Labs LLC, Plymouth, MN (US)

(72) Inventors: Radu Teodorescu, New York, NY (US); Ryan Caudy, New York, NY (US); David R. Kent, IV, Colorado Springs, CO (US); Charles Wright, Cortlandt Manor, NY (US); Nathan Dorfman, Sandy, UT (US); Brian Ries, St Louis Park, MN (US)

(73) Assignee: Deephaven Data Labs LLC, Plymouth, MN (US)

( * ) Notice: Subject to any disclaimer, the term of this patent is extended or adjusted under 35 U.S.C. 154(b) by 0 days.

(21) Appl. No.: 15/155,005

(22) Filed: May 14, 2016

(65) Prior Publication Data

US 2016/0335323 A1    Nov. 17, 2016

Related U.S. Application Data

(60) Provisional application No. 62/161,813, filed on May 14, 2015.

(51) Int. Cl.
*G06F 17/30* (2006.01)
*H04L 29/06* (2006.01)
(Continued)

(52) U.S. Cl.
CPC ............ *H04L 67/42* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS

| 5,335,202 A | 8/1994 | Manning et al. |
| 5,452,434 A | 9/1995 | MacDonald |

(Continued)

FOREIGN PATENT DOCUMENTS

| CA | 2309462 A1 | 12/2000 |
| EP | 1406463 A2 | 4/2004 |

(Continued)

OTHER PUBLICATIONS

"IBM Informix TimeSeries data management", dated Jan. 18, 2016. Retrieved from https://web.archive.org/web/20160118072141/http://www-01.ibm.com/software/data/informix/timeseries/.

(Continued)

*Primary Examiner* — Alicia M Willoughby
(74) *Attorney, Agent, or Firm* — Carmichael IP, PLLC

(57) ABSTRACT

The disclosed subject matter includes systems, methods, and computer readable medium for improving performance of a computer data system. An electronic request for a remote query processor (RQP) can be sent from the persistent query controller to a remote query dispatcher (RQD) executing on a query server computer. The request can include parameters for configuring the RQP and an operating environment for the RQP. The RQD can automatically attempt to allocate an isolated operating environment for the RQP and to prepare the RQP on the query server computer. When the RQP is prepared, performing: providing the controller with an address assignment of the RQP; automatically connecting from the controller to the RQP via a network; transmitting a persistent database query electronically from the controller to the RQP; publishing persistent database query configuration information including a query state and the RQP address assignment; and connecting from a client to the RQP.

27 Claims, 6 Drawing Sheets

(51) Int. Cl.

| | |
|---|---|
| G06F 3/0482 | (2013.01) |
| G06F 3/0489 | (2013.01) |
| G06F 17/22 | (2006.01) |
| G06F 17/24 | (2006.01) |
| G06F 17/27 | (2006.01) |
| G06F 12/084 | (2016.01) |
| H04L 12/58 | (2006.01) |
| G06F 15/173 | (2006.01) |
| G06F 3/0481 | (2013.01) |
| G06F 3/0484 | (2013.01) |
| G06F 3/0485 | (2013.01) |
| G06F 12/02 | (2006.01) |
| G06F 8/30 | (2018.01) |
| G06F 8/41 | (2018.01) |
| H04L 29/08 | (2006.01) |
| G06F 3/06 | (2006.01) |
| G06F 11/14 | (2006.01) |
| G06F 8/60 | (2018.01) |
| H04L 12/18 | (2006.01) |
| H04L 29/12 | (2006.01) |
| G06F 12/14 | (2006.01) |
| G06F 21/00 | (2013.01) |
| G06F 21/62 | (2013.01) |
| G06F 17/40 | (2006.01) |

(52) U.S. Cl.
CPC ........ *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 17/2235* (2013.01); *G06F 17/24* (2013.01); *G06F 17/245* (2013.01); *G06F 17/246* (2013.01); *G06F 17/276* (2013.01); *G06F 17/2715* (2013.01); *G06F 17/30117* (2013.01); *G06F 17/30283* (2013.01); *G06F 17/30303* (2013.01); *G06F 17/30312* (2013.01); *G06F 17/30315* (2013.01); *G06F 17/30321* (2013.01); *G06F 17/30324* (2013.01); *G06F 17/30327* (2013.01); *G06F 17/30333* (2013.01); *G06F 17/30336* (2013.01); *G06F 17/30339* (2013.01); *G06F 17/30345* (2013.01); *G06F 17/30368* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30451* (2013.01); *G06F 17/30454* (2013.01); *G06F 17/30457* (2013.01); *G06F 17/30477* (2013.01); *G06F 17/30483* (2013.01); *G06F 17/30498* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30902* (2013.01); *G06F 17/30958* (2013.01); *G06F 17/30997* (2013.01); *G06F 21/00* (2013.01); *G06F 21/6209* (2013.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/28* (2013.01); *H04L 67/2833* (2013.01); *H04L 67/2842* (2013.01); *H04L 67/34* (2013.01); *H04L 69/16* (2013.01); *G06F 17/30342* (2013.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *H04L 67/2847* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |

(56) References Cited

U.S. PATENT DOCUMENTS

| | | |
|---|---|---|
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Yah et al. |
| 7,031,962 B2 | 4/2006 | Moses |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 * | 2/2009 | Cutsinger ......... G06F 17/30545 |
| 7,506,055 B2 | 3/2009 | McClain et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,747,640 B2 | 6/2010 | Dellinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 * | 8/2014 | Kuzkin ................... H04L 67/40 709/208 |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |

(56) References Cited

U.S. PATENT DOCUMENTS

| | | |
|---|---|---|
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,613,018 B2 | 4/2017 | Zeldis et al. |
| 9,633,060 B2 | 4/2017 | Caudy et al. |
| 9,679,006 B2 | 6/2017 | Wright et al. |
| 9,805,084 B2 | 10/2017 | Wright et al. |
| 9,832,068 B2 | 11/2017 | McSherry et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kenai et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1* | 9/2003 | Patterson ............ H04L 67/1036 |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheitler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nod et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1* | 1/2008 | Mattsson ............ G06F 21/6227 713/194 |
| 2008/0033907 A1 | 2/2008 | Woehler et al. |
| 2008/0034084 A1* | 2/2008 | Pandya ................ H04L 67/36 709/224 |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0271472 A1* | 10/2009 | Scheifler ................ G06F 9/485 709/202 |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1* | 7/2010 | Ladki .................... G06F 21/335 726/19 |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1* | 5/2011 | Vilke ........................ G06F 9/54 715/736 |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1* | 6/2012 | Clark ................ G06F 11/0727 714/16 |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |

(56) References Cited

U.S. PATENT DOCUMENTS

| | | | |
|---|---|---|---|
| 2013/0198232 A1 | 8/2013 | Shamgunov et al. | |
| 2013/0226959 A1 | 8/2013 | Dittrich et al. | |
| 2013/0246560 A1 | 9/2013 | Feng et al. | |
| 2013/0263123 A1 | 10/2013 | Zhou et al. | |
| 2013/0290243 A1 | 10/2013 | Hazel et al. | |
| 2013/0304725 A1 | 11/2013 | Nee et al. | |
| 2013/0304744 A1 | 11/2013 | McSherry et al. | |
| 2013/0311352 A1 | 11/2013 | Kayanuma et al. | |
| 2013/0311488 A1 | 11/2013 | Erdogan et al. | |
| 2013/0318129 A1 | 11/2013 | Vingralek et al. | |
| 2013/0346365 A1 | 12/2013 | Kan et al. | |
| 2014/0019494 A1 | 1/2014 | Tang | |
| 2014/0040203 A1 | 2/2014 | Lu et al. | |
| 2014/0059646 A1 | 2/2014 | Hannel et al. | |
| 2014/0082724 A1 | 3/2014 | Pearson et al. | |
| 2014/0136521 A1 | 5/2014 | Pappas | |
| 2014/0143123 A1 | 5/2014 | Banke et al. | |
| 2014/0149997 A1 | 5/2014 | Kukreja et al. | |
| 2014/0156618 A1 | 6/2014 | Castellano | |
| 2014/0173023 A1 | 6/2014 | Varney et al. | |
| 2014/0181036 A1 | 6/2014 | Dhamankar et al. | |
| 2014/0181081 A1 | 6/2014 | Veldhuizen | |
| 2014/0188924 A1 | 7/2014 | Ma et al. | |
| 2014/0195558 A1 | 7/2014 | Murthy et al. | |
| 2014/0201194 A1 | 7/2014 | Reddy et al. | |
| 2014/0215446 A1 | 7/2014 | Araya et al. | |
| 2014/0222768 A1 | 8/2014 | Rambo et al. | |
| 2014/0229506 A1 | 8/2014 | Lee | |
| 2014/0229874 A1 | 8/2014 | Strauss | |
| 2014/0244687 A1 | 8/2014 | Shmueli et al. | |
| 2014/0279810 A1 | 9/2014 | Mann et al. | |
| 2014/0280522 A1 | 9/2014 | Watte | |
| 2014/0282227 A1 | 9/2014 | Nixon et al. | |
| 2014/0282444 A1 | 9/2014 | Araya et al. | |
| 2014/0282540 A1* | 9/2014 | Bonnet | G06F 9/45558 718/1 |
| 2014/0297611 A1 | 10/2014 | Abbour et al. | |
| 2014/0317084 A1 | 10/2014 | Chaudhry et al. | |
| 2014/0324821 A1 | 10/2014 | Meiyyappan et al. | |
| 2014/0330700 A1 | 11/2014 | Studnitzer et al. | |
| 2014/0330807 A1 | 11/2014 | Weyerhaeuser et al. | |
| 2014/0344186 A1 | 11/2014 | Nadler | |
| 2014/0344391 A1 | 11/2014 | Varney et al. | |
| 2014/0359574 A1 | 12/2014 | Beckwith et al. | |
| 2014/0372482 A1 | 12/2014 | Martin et al. | |
| 2014/0380051 A1 | 12/2014 | Edward et al. | |
| 2015/0019516 A1 | 1/2015 | Wein et al. | |
| 2015/0026155 A1* | 1/2015 | Martin | G06F 17/30554 707/722 |
| 2015/0067640 A1 | 3/2015 | Booker et al. | |
| 2015/0074066 A1 | 3/2015 | Li et al. | |
| 2015/0082218 A1 | 3/2015 | Affoneh et al. | |
| 2015/0088894 A1 | 3/2015 | Czarlinska et al. | |
| 2015/0095381 A1 | 4/2015 | Chen et al. | |
| 2015/0120261 A1 | 4/2015 | Giannacopoulos et al. | |
| 2015/0127599 A1 | 5/2015 | Schiebeler | |
| 2015/0154262 A1 | 6/2015 | Yang et al. | |
| 2015/0172117 A1 | 6/2015 | Dolinsky et al. | |
| 2015/0188778 A1 | 7/2015 | Asayag et al. | |
| 2015/0205588 A1 | 7/2015 | Bates et al. | |
| 2015/0205589 A1 | 7/2015 | Daily | |
| 2015/0254298 A1 | 9/2015 | Bourbonnais et al. | |
| 2015/0304182 A1 | 10/2015 | Brodsky et al. | |
| 2015/0317359 A1 | 11/2015 | Tran et al. | |
| 2015/0356157 A1 | 12/2015 | Anderson et al. | |
| 2016/0026442 A1 | 1/2016 | Chhaparia | |
| 2016/0065670 A1 | 3/2016 | Kimmel et al. | |
| 2016/0092599 A1* | 3/2016 | Barsness | G06F 17/30501 707/718 |
| 2016/0125018 A1 | 5/2016 | Tomoda et al. | |
| 2016/0171070 A1* | 6/2016 | Hrle | G06F 17/30578 707/615 |
| 2016/0253294 A1 | 9/2016 | Allen et al. | |
| 2016/0335330 A1 | 11/2016 | Teodorescu et al. | |
| 2016/0335361 A1 | 11/2016 | Teodorescu et al. | |
| 2017/0161514 A1* | 6/2017 | Dettinger | G06F 21/6227 |
| 2017/0235794 A1 | 8/2017 | Wright et al. | |
| 2017/0359415 A1 | 12/2017 | Venkatraman et al. | |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | WO-2014026220 A1 | 2/2014 |
| WO | 2014143208 A1 | 9/2014 |

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.

"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.

"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.

"Sophia Database—Architecture", dated Jan. 18, 2016. Retrieved from https://web.archive.org/web/20160118052919/http://sphia.org/architecture.html.

"Google Protocol RPC Library Overview", dated Apr. 27, 2016. Retrieved from https://cloud.google.com/appengine/docs/python/tools/protorpc/ (last accessed Jun. 16, 2016).

"Maximize Data Value with Very Large Database Management by SAP® Sybase® IQ", dated 2013. Retrieved from http://www.sap.com/bin/sapcom/en_us/downloadasset.2013-06-jun-11-11.maximize-data-value-with-very-large-database-management-by-sap-sybase-ig-pdf.html.

"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.

"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Oracle® Big Data Appliance—Software User's Guide", dated Feb. 2015. Retrieved from https://docs.oracle.com/cd/E55905_01/doc.40/e55814.pdf.

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).

Mariyappan, Balakrishnan. "10 Useful Linux Bash_Completion Complete Command Examples (Bash Command Line Completion

(56) References Cited

OTHER PUBLICATIONS on Steroids)", dated Dec. 2, 2013. Retrieved from http://www.thegeekstuff.com/2013/12/bash-completion-complete/ (last accessed Jun. 16, 2016).

Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).

Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).

Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.

"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.

"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.

Borror, Jefferey A. "Q for Mortals 2.0", dated Nov. 1, 2011. Retreived from http://code.kx.com/wiki/JB:QforMortals2/contents.

Gai, Lei et al. "An Efficient Summary Graph Driven Method for RDF Query Processing", dated Oct. 27, 2015. Retreived from http://arxiv.org/pdf/1510.07749.pdf.

Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.

Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.

Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.

Non-final Office Action dated Sep. 9, 2016, in U.S. Appl. No. 15/154,996.

Non-final Office Action dated Sep. 9, 2016, in U.S. Appl. No. 15/155,010.

Notice of Allowance dated Dec. 19, 2016, in U.S. Appl. No. 15/155,001.

Notice of Allowance dated Dec. 22, 2016, in U.S. Appl. No. 15/155,011.

Notice of Allowance dated Dec. 7, 2016, in U.S. Appl. No. 15/154,985.

Notice of Allowance dated Feb. 1, 2017, in U.S. Appl. No. 15/154,988.

Notice of Allowance dated Jan. 30, 2017, in U.S. Appl. No. 15/154,987.

Notice of Allowance dated Nov. 17, 2016, in U.S. Appl. No. 15/154,991.

Notice of Allowance dated Nov. 21, 2016, in U.S. Appl. No. 15/154,983.

Notice of Allowance dated Nov. 8, 2016, in U.S. Appl. No. 15/155,007.

Notice of Allowance dated Oct. 11, 2016, in U.S. Appl. No. 15/155,007.

Notice of Allowance dated Oct. 21, 2016, in U.S. Appl. No. 15/154,999.

PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.

Smith, Ian. "Guide to Using SQL: Computed and Automatic Columns." RDB Jornal, dated Sep. 2008, retrieved Aug. 15, 2016, retrieved from the Internet <URL: http://www.oracle.com/technetwork/products/rdb/automatic-columns-132042.pdf>.

Wes McKinney & PyData Development Team. "pandas: powerful Python data analysis toolkit, Release 0.16.1" Dated May 11, 2015. Retrieved from: http://pandas.pydata.org/pandas-doc.s/version/0.16.1/index.html.

Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.

Ex Parte Quayle Action mailed Aug. 8, 2016, in U.S. Appl. No. 15/154,999.

Final Office Action dated Dec. 19, 2016, in U.S. Appl. No. 15/154,995.
Final Office Action dated Jan. 27, 2017, in U.S. Appl. No. 15/154,980.
Final Office Action dated Jan. 31, 2017, in U.S. Appl. No. 15/154,996.

International Search Report and Written Opinion dated Aug. 18, 2016, in International Appln. No. PCT/US2016/032582 filed May 14, 2016.

International Search Report and Written Opinion dated Aug. 18, 2016, in International Appln. No. PCT/US2016/032584 filed May 14, 2016.

International Search Report and Written Opinion dated Aug. 18, 2016, in International Appln. No. PCT/US2016/032588 filed May 14, 2016.

International Search Report and Written Opinion dated Aug. 18, 2016, in International Appln. No. PCT/US2016/032593 filed May 14, 2016.

International Search Report and Written Opinion dated Aug. 18, 2016, in International Appln. No. PCT/US2016/032597 filed May 14, 2016.

International Search Report and Written Opinion dated Aug. 18, 2016, in International Appln. No. PCT/US2016/032599 filed May 14, 2016.

International Search Report and Written Opinion dated Aug. 18, 2016, in International Appln. No. PCT/US2016/032605 filed May 14, 2016.

International Search Report and Written Opinion dated Aug. 25, 2016, in International Appln. No. PCT/US2016/032590 filed May 14, 2016.

International Search Report and Written Opinion dated Aug. 25, 2016, in International Appln. No. PCT/US2016/032592 filed May 14, 2016.

International Search Report and Written Opinion dated Aug. 4, 2016, in International Appln. No. PCT/US2016/032581 filed May 14, 2016.

International Search Report and Written Opinion dated Jul. 28, 2016, in International Appln. No. PCT/US2016/032586 filed May 14, 2016.

International Search Report and Written Opinion dated Jul. 28, 2016, in International Appln. No. PCT/US2016/032587 filed May 14, 2016.

International Search Report and Written Opinion dated Jul. 28, 2016, in International Appln. No. PCT/US2016/032589 filed May 14, 2016.

International Search Report and Written Opinion dated Sep. 1, 2016, in International Appln. No. PCT/US2016/032596 filed May 14, 2016.

International Search Report and Written Opinion dated Sep. 1, 2016, in International Appln. No. PCT/US2016/032598 filed May 14, 2016.

International Search Report and Written Opinion dated Sep. 1, 2016, in International Appln. No. PCT/US2016/032601 filed May 14, 2016.

International Search Report and Written Opinion dated Sep. 1, 2016, in International Appln. No. PCT/US2016/032602 filed May 14, 2016.

(56) References Cited

OTHER PUBLICATIONS

International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Mallet, "Relational Database Support for Spatia-Temporal Data", Technical Report TR 04-21, Sep. 2004, University of Alberta, Department of Computing Science.
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,981.
Non-final Office Action dated Aug. 8, 2016, in U.S. Appl. No. 15/154,985.
Non-final Office Action dated Nov. 17, 2016, in U.S. Appl. No. 15/154,999.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 29, 2016, in U.S. Appl. No. 15/154,990.
Non-final Office Action dated Sep. 8, 2016, in U.S. Appl. No. 15/154,975.
Corrected Notice of Allowability dated Mar. 10, 2017, in U.S. Appl. No. 15/154,979.
Final Office Action dated Feb. 24, 2017, in U.S. Appl. No. 15/154,993.
Final Office Action dated Mar. 1, 2017, in U.S. Appl. No. 15/154,975.
Final Office Action dated Mar. 13, 2017, in U.S. Appl. No. 15/155,012.
Non-final Office Action dated Feb. 8, 2017, in U.S. Appl. No. 15/154,997.
Non-final Office Action dated Mar. 2, 2017, in U.S. Appl. No. 15/154,984.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Mar. 2, 2017, in U.S. Appl. No. 15/154,998.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Mar. 31, 2017, in U.S. Appl. No. 15/154,996.
Advisory Action dated May 3, 2017, in U.S. Appl. No. 15/154,993.
Final Office Action dated Apr. 10, 2017, in U.S. Appl. No. 15/155,006.
Final Office Action dated Jun. 23, 2017, in U.S. Appl. No. 15/154,997.
Final Office Action dated May 15, 2017, in U.S. Appl. No. 15/155,010.
Final Office Action dated May 4, 2017, in U.S. Appl. No. 15/155,009.
Non-final Office Action dated Apr. 19, 2017, in U.S. Appl. No. 15/154,974.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 31, 2017, in U.S. Appl. No. 15/154,998.
Notice of Allowance dated May 10, 2017, in U.S. Appl. No. 15/154,988.
Advisory Action dated Dec. 21, 2017, in U.S. Appl. No. 15/154,984.
Breitbart, Update Propagation Protocols for Replicated Databases, SIGMOD '99 Philadelphia PA, 1999, pp. 97-108.
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Oct. 26, 2017, in U.S. Appl. No. 15/610,162.
Decision on Pre-Appeal Conference Request dated Nov. 20, 2017, in U.S. Appl. No. 15/154,997.
Final Office Action dated Dec. 29, 2017, in U.S. Appl. No. 15/154,974.
Final Office Action dated Jul. 27, 2017, in U.S. Appl. No. 15/154,993.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Aug. 14, 2017, in U.S. Appl. No. 15/464,314.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Nov. 15, 2017, in U.S. Appl. No. 15/654,461.
Non-final Office Action dated Nov. 30, 2017, in U.S. Appl. No. 15/155,012.

(56) References Cited

OTHER PUBLICATIONS

Non-final Office Action dated Oct. 5, 2017, in U.S. Appl. No. 15/428,145.
Notice of Allowance dated Feb. 12, 2018, in U.S. Appl. No. 15/813,142.
Notice of Allowance dated Feb. 26, 2018, in U.S. Appl. No. 15/428,145.
Notice of Allowance dated Jul. 28, 2017, in U.S. Appl. No. 15/155,009.
Notice of Allowance dated Mar. 1, 2018, in U.S. Appl. No. 15/464,314.
Notice of Allowance dated Nov. 17, 2017, in U.S. Appl. No. 15/154,993.
Notice of Allowance dated Oct. 6, 2017, in U.S. Appl. No. 15/610,162.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.

* cited by examiner

PERSISTENT QUERY DISPATCH AND EXECUTION ARCHITECTURE

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for persistent query connection architecture.

Some graphical user interfaces may provide a display of information from a database query result. However, in the case of data that is changing over time and would cause a change in a query result over time, a typical static query result display may not provide an up-to-date visualization of the changed data. A need may exist to provide a dynamically updating display of a query result that is changing over time. Also, a need may exist to provide an access control mechanism for allowing a user to create dynamically updating, long running, repeated, and/or automatically started queries, share access to queries with other users, share query results between queries, provide real-time data to a GUI/console, provide real-time data to a query distributed across multiple jobs, enforce access controls based on user roles, and/or provide remote debugging of a running query.

Embodiments were conceived in light of the above mentioned needs, problems and/or limitations, among other things.

Some implementations can include a computer data system having a persistent query dispatch and execution architecture, the system can comprise one or more processors and computer readable storage coupled to the one or more processors, the computer readable storage having stored thereon instructions that, when executed by the one or more processors, cause the one or more processors to perform operations. The operations can include sending an electronic request for a remote query processor from the persistent query controller to a remote query dispatcher executing on a query server computer. The request can include parameters for configuring the remote query processor and an operating environment for the remote query processor. The operations can also include attempting, at the remote query dispatcher, to allocate an isolated operating environment for the remote query processor and to start execution of the remote query processor on the query server computer.

When the remote query processor is started, operations can be performed that include: providing the persistent query controller with an address assignment of the remote query processor or of a proxy machine in communication with the remote query processor, the address assignment identifying a specific address of the query server computer or of the proxy machine available to connect electronically over an electronic communications network; automatically connecting from the persistent query controller to the remote query processor via the electronic communications network; transmitting a persistent database query electronically from the persistent query controller to the remote query processor; publishing persistent database query configuration information including a state of the persistent database query and the address assignment of the remote query processor; and/or connecting from a client to the remote query processor via the electronic communications network.

The operations can further include, when the connection by the client is allowed, receiving at the client at least a portion of a current result of the persistent database query from the remote query processor.

The operations can further include, when the connection by the client is allowed, filtering, based on the access control information, a current result of the persistent database query requested by the client from the remote query processor, and sending at least a portion of the filtered current result of the persistent database query to the client.

The operations can further include determining whether to allow the connection by the client to the remote query processor based on access control information associated with the persistent database query, and, when the connection by the client is allowed, sending a request to perform an administrative operation with respect to the persistent database query from the client to the persistent query controller, and determining whether the client is authorized to perform the administrative operation based on the access control information.

The operations can further include sending, from a second client different than the client, an instruction to the persistent query controller to start, stop, restart, modify parameters, or modify code of the persistent database query.

The operations can further include, when the connection by the client is allowed, receiving a result of the persistent database query at the client, displaying at least a portion of the result at the client via a graphical user interface and/or a console, receiving at least a portion of an updated result of the persistent database query from the remote query processor; and responsive to the receiving the at least a portion of the updated result, updating the graphical user interface and/or console to display the at least a portion of the updated result.

The operations can further include, determining whether the remote query processor rejects the request for a remote query processor from the persistent query controller. When the remote query dispatcher rejects the request, the operations can include publishing an indication of the rejection. The operations can further include detecting, by the remote query processor or remote query dispatcher, an error in the execution of the persistent database query and, when the remote query processor or remote query dispatcher detects an error in the execution of the persistent database query, publishing an indication of the error.

The operations can further include, when the connection by the client is allowed, transmitting an additional query task electronically from the client to the remote query processor, executing, at the remote query processor, the additional query task, and receiving at least a portion of a result of the additional query task at the client.

The operations can further include periodically providing a liveness indication from the persistent query controller to the remote query dispatcher, and when the liveness indication is not received after a limited amount of time, stopping the remote query processor.

Some implementations can include a method for improving performance of a computer data system through control of a persistent query dispatch and execution architecture. The method can include sending an electronic request for a remote query processor from the persistent query controller to a remote query dispatcher executing on a query server computer. The request can include parameters for configuring the remote query processor and an operating environment for the remote query processor. The method can also include automatically attempting, at the remote query dispatcher, to allocate an isolated operating environment for the remote query processor and to prepare the remote query processor on the query server computer.

When the remote query processor is prepared, the method can include performing operations. The operations can include providing the persistent query controller with an address assignment of the remote query processor or of a proxy machine in communication with the remote query processor, the address assignment identifying a specific address of the query server computer or of the proxy machine available to connect electronically over an electronic communications network. The operations can also include automatically connecting from the persistent query controller to the remote query processor via the electronic communications network. The operations can further include transmitting a persistent database query electronically from the persistent query controller to the remote query processor. The operations can also include publishing persistent database query configuration information including a state of the persistent database query and the address assignment of the remote query processor. The operations can further include connecting from a client to the remote query processor via the electronic communications network.

The method can further include, when the connection by the client is allowed, receiving at the client at least a portion of a current result of the persistent database query from the remote query processor.

The method can further include, when the connection by the client is allowed, filtering, based on the access control information, a current result of the persistent database query requested by the client from the remote query processor, and sending at least a portion of the filtered current result of the persistent database query to the client.

The method can further include determining whether to allow the connection by the client to the remote query processor based on access control information associated with the persistent database query. The method can further include, when the connection by the client is allowed, sending a request to perform an administrative operation with respect to the persistent database query from the client to the persistent query controller, and determining whether the client is authorized to perform the administrative operation based on the access control information.

The method can further include, sending, from a second client different than the client, an instruction to the persistent query controller to start, stop, or restart the persistent database query.

The method can further include, when the connection by the client is allowed, receiving a result of the persistent database query at the client. The method can also include displaying at least a portion of the result at the client via a graphical user interface and/or a console. The method can further include receiving at least a portion of an updated result of the persistent database query from the remote query processor. The method can further include, responsive to the receiving the at least a portion of the updated result, updating the graphical user interface and/or console to display the at least a portion of the updated result.

The method can include determining whether the remote query processor rejects the request for a remote query processor from the persistent query controller. When the remote query dispatcher rejects the request, the method can include publishing an indication of the rejection. The method can include detecting, by the remote query processor or remote query dispatcher, an error in the execution of the persistent database query, and, when the remote query processor or remote query dispatcher detects an error in the execution of the persistent database query, the method can further include publishing an indication of the error.

The method can further include, when the connection by the client is allowed, transmitting an additional query task electronically from the client to the remote query processor, executing, at the remote query processor, the additional query task, and optionally receiving at least a portion of a result of the additional query task at the client.

The method can include periodically providing a liveness indication from the persistent query controller to the remote query dispatcher, and when the liveness indication is not received after a limited amount of time, stopping the remote query processor.

Some implementations can include a nontransitory computer readable medium having stored thereon software instructions that, when executed by one or more processors, cause the processors to perform operations. The operations can include sending an electronic request for a remote query processor from the persistent query controller to a remote query dispatcher executing on a query server computer, wherein the request includes parameters for configuring the remote query processor and an operating environment for the remote query processor. The operations can also include automatically attempting, at the remote query dispatcher, to allocate an isolated operating environment for the remote query processor and to run of the remote query processor on the query server computer.

When the remote query processor is running, the operations can include performing additional operations. The additional operations can include providing the persistent query controller with an address assignment of the remote query processor or of a proxy machine in communication with the remote query processor, the address assignment identifying a specific address of the query server computer or of the proxy machine available to connect electronically over an electronic communications network. The additional operations can also include automatically connecting from the persistent query controller to the remote query processor via the electronic communications network. The additional operations can further include transmitting a persistent database query electronically from the persistent query controller to the remote query processor. The additional operations can also include publishing persistent database query configuration information including a state of the persistent database query and the address assignment of the remote query processor. The additional operations can further include connecting from a client to the remote query processor via the electronic communications network.

In any of the above-mentioned implementations, the client can be another remote query processor.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
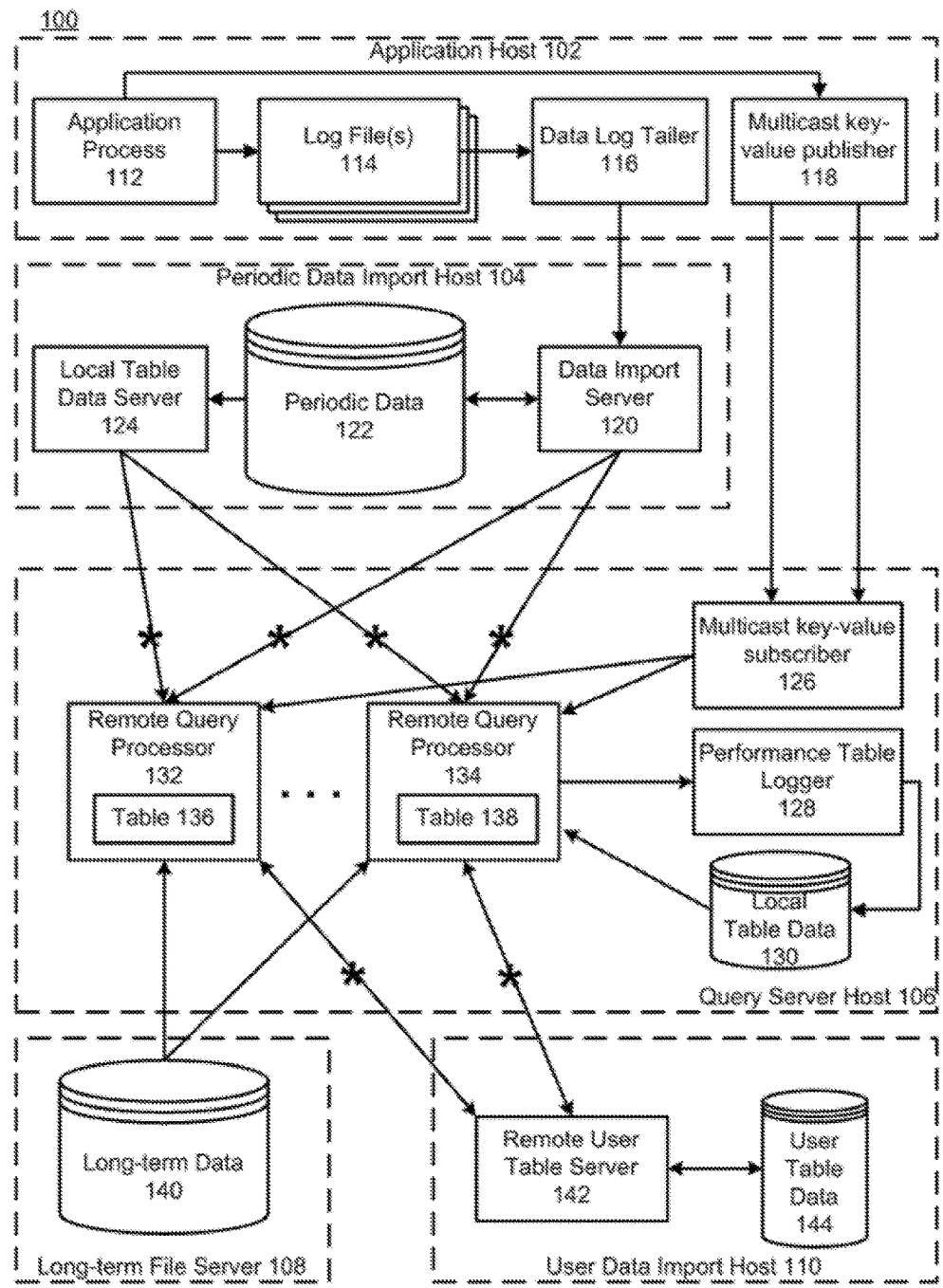
FIG. 1 is a diagram of an example computer data system showing an example data distribution configuration in accordance with some implementations.
Figure 2:
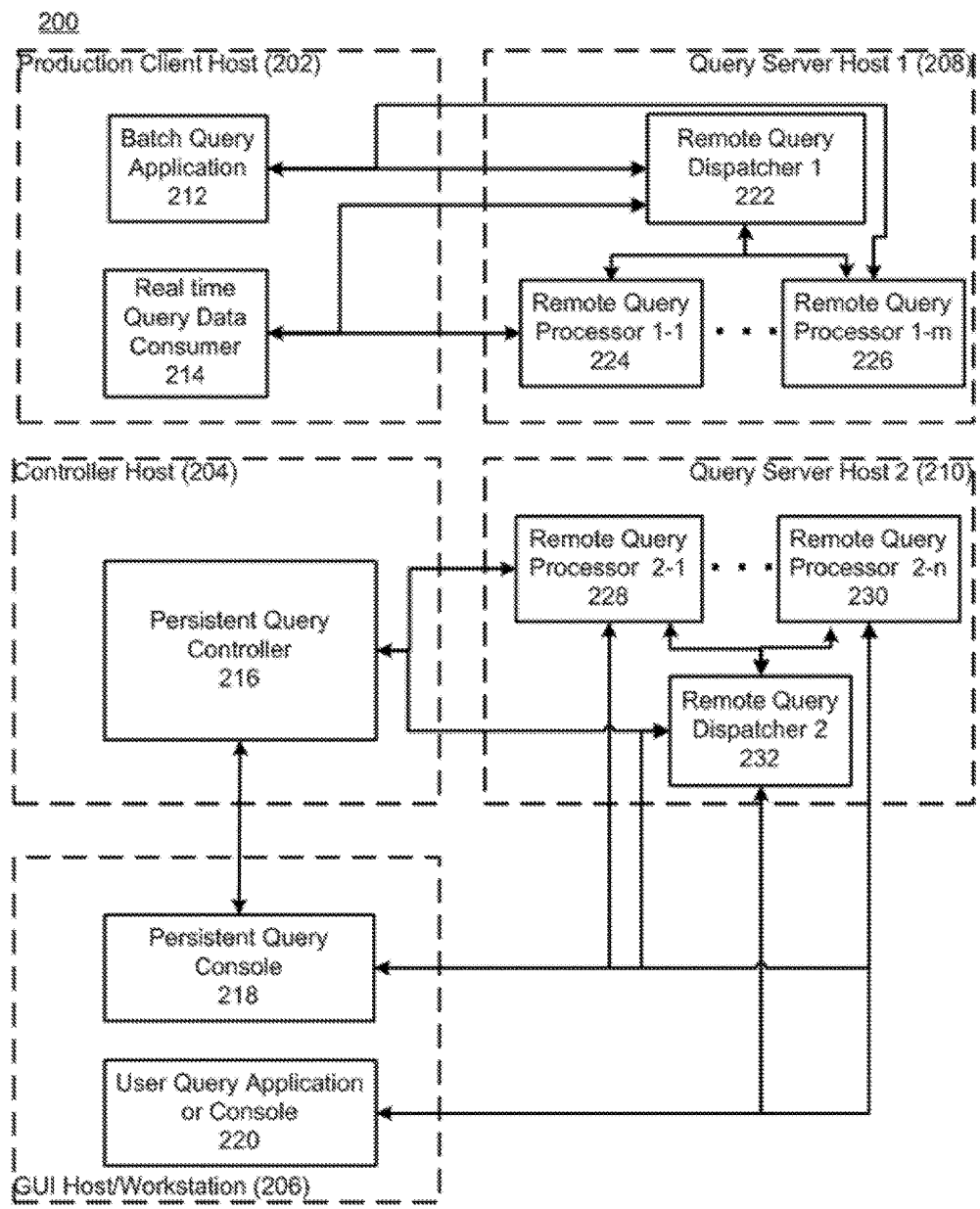
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object is can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron jobs). Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
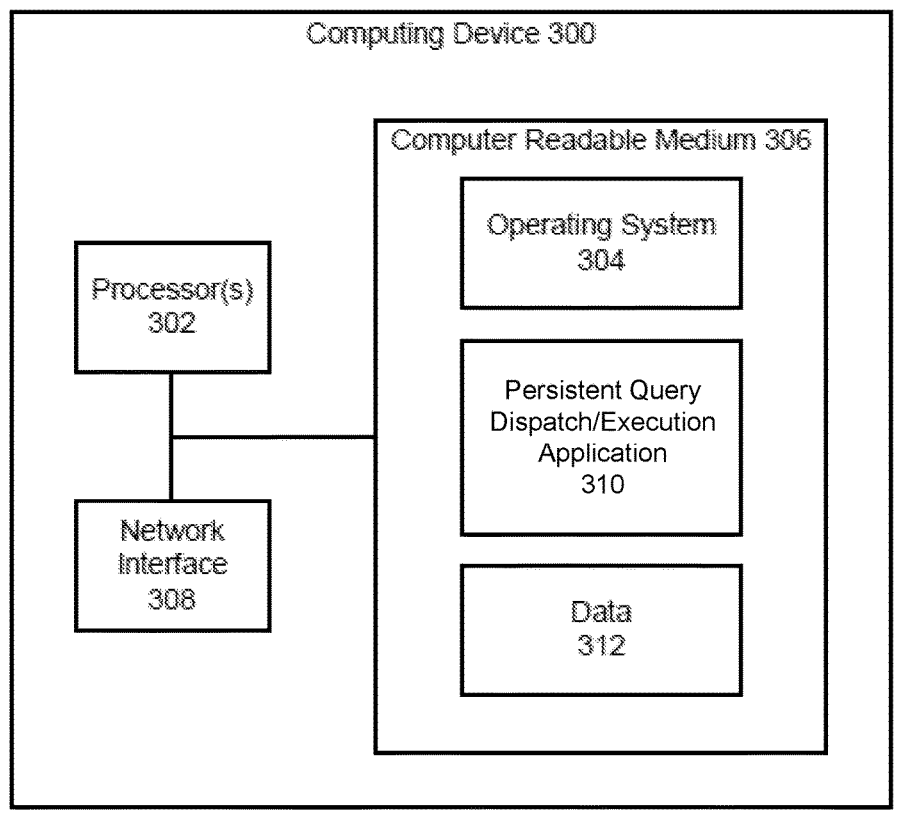
FIG. 3 is a diagram of an example computing device in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include persistent query dispatch/execution application 310 (e.g., console 218 and/or user query application 220) and a data section 312 (e.g., for persistent query configuration information, index data structures, column source maps, etc.).

In operation, the processor 302 may execute the application 310 stored in the memory 306. The application 310 can include software instructions that, when executed by the processor, cause the processor to perform operations for persistent query dispatch/execution in accordance with the present disclosure (e.g., performing one or more of 502-512, or one or more of 602-610 described below). The application program 310 can operate in conjunction with the data section 312 and the operating system 304.

Figure 4:
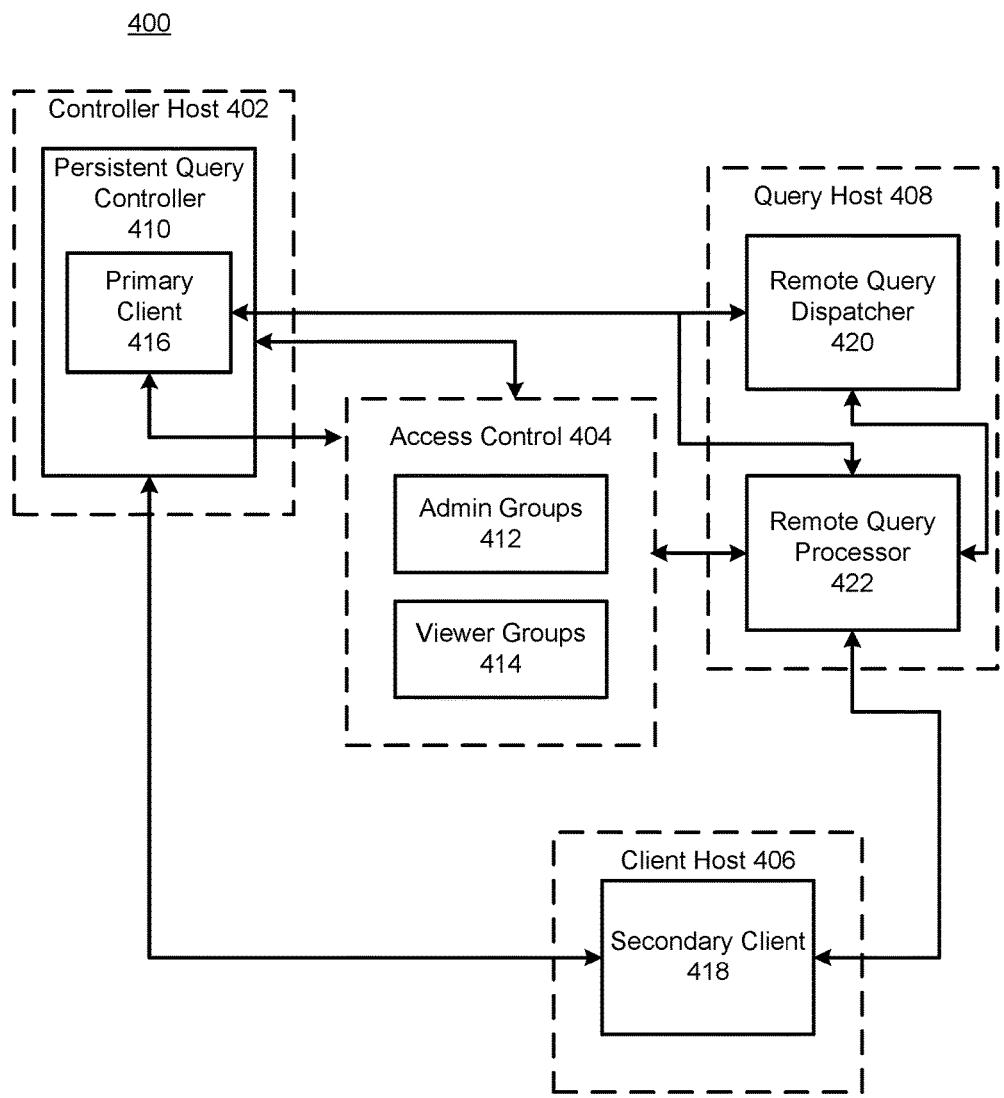
FIG. 4 is a diagram of an example persistent query dispatch and execution architecture in accordance with some implementations.

In some embodiments, application program 310 includes a graphical user interface (GUI) that includes a console (e.g., console 218) and/or a user query application (e.g., 220). The GUI can include a configuration panel that provides information on jobs running on a query server host (e.g., 106 and/or 210, as shown in FIG. 1 and FIG. 2, respectively) and/or queries being managed by a persistent query controller (e.g., 216 and/or 410, as shown in FIG. 2 and FIG. 4, respectively). The information provided by the configuration panel can include: job owner, type of job (script, trading strategy, etc.), state of the job (running, exception, stopped, etc.), job start time, etc. The GUI can allow a user to perform an administrative action (e.g., start, stop, restart, edit, or view) on one or more jobs (e.g., by allowing the user to select one or more jobs, right click on the selection, and choose the action to be performed for the selected jobs). In some embodiments, jobs can also include simulated jobs that can replay historical data.

In some embodiments, the GUI includes elements that allow users to add a new job and configure it with the appropriate parameters. For example, right clicking on a query can allow a user to edit the parameters for the query (e.g. change RAM usage). The editable parameters can include: memory usage (e.g., RAM usage), virtual machine parameters (e.g., Java Virtual Machine (JVM) parameters), operating system parameters (e.g. shell variables), code executed, access control parameters (e.g., access control 404), configuration type (e.g. script, trading strategy, or replay), query server (or load balancer) (e.g., query host 210 or 408), classpath, enabled, script location or actual script code, script language, start time, and/or stop time. In some embodiments, the GUI elements include start/stop/restart/edit/view, etc. admin actions.

In some embodiments, users have permission levels and resource allocations. Based on the user permissions and resources, the user can create a query. The user "owns" their query (i.e., the user is set as the owner of the query) and can set access control information (e.g., access control 404 as shown in FIG. 4) that limits access to the query and the remote query processor executing the query. A user's ability to limit access to their queries can be limited by, for example, system-level access controls (e.g., allow supervisor users to have access to all queries of the their respective subordinates) which the user cannot override. User setable access control information can include an admin group (e.g., admin groups 412) and a viewer group (e.g., viewer groups 414). The query runs as the owner and is limited in scope to what the owner can see. In some embodiments, the owner, zero or more administrators, and zero or more global super-users are able to view all of the results of the query; and also edit, view the code, stop it, start it, etc. The viewers can view the results of the query, but are not allowed to view the code or perform any administrative actions. In some embodiments, viewers can be limited to viewing only a limited set of the results of the query. In some embodiments, administrators, global super users, and/or owners may allow viewers to restart the query when it is already stopped.

FIG. 4 is a diagram of an example persistent query dispatch and execution architecture 400 in accordance with some implementations. Persistent query dispatch and execution architecture 400 includes a controller host 402, a query host 408, a client host 406, and an access control 404. Controller host 402 includes a persistent query controller (PQC) 410, which includes a primary client 416. Query host 408 includes a remote query dispatcher (420) and a remote query processor (RQP) 422. Client host 406 includes a secondary client 418. Access control 404 includes access control groups/roles (e.g., as discussed above) including admin groups 412 and viewer groups 414.

Figure 5:
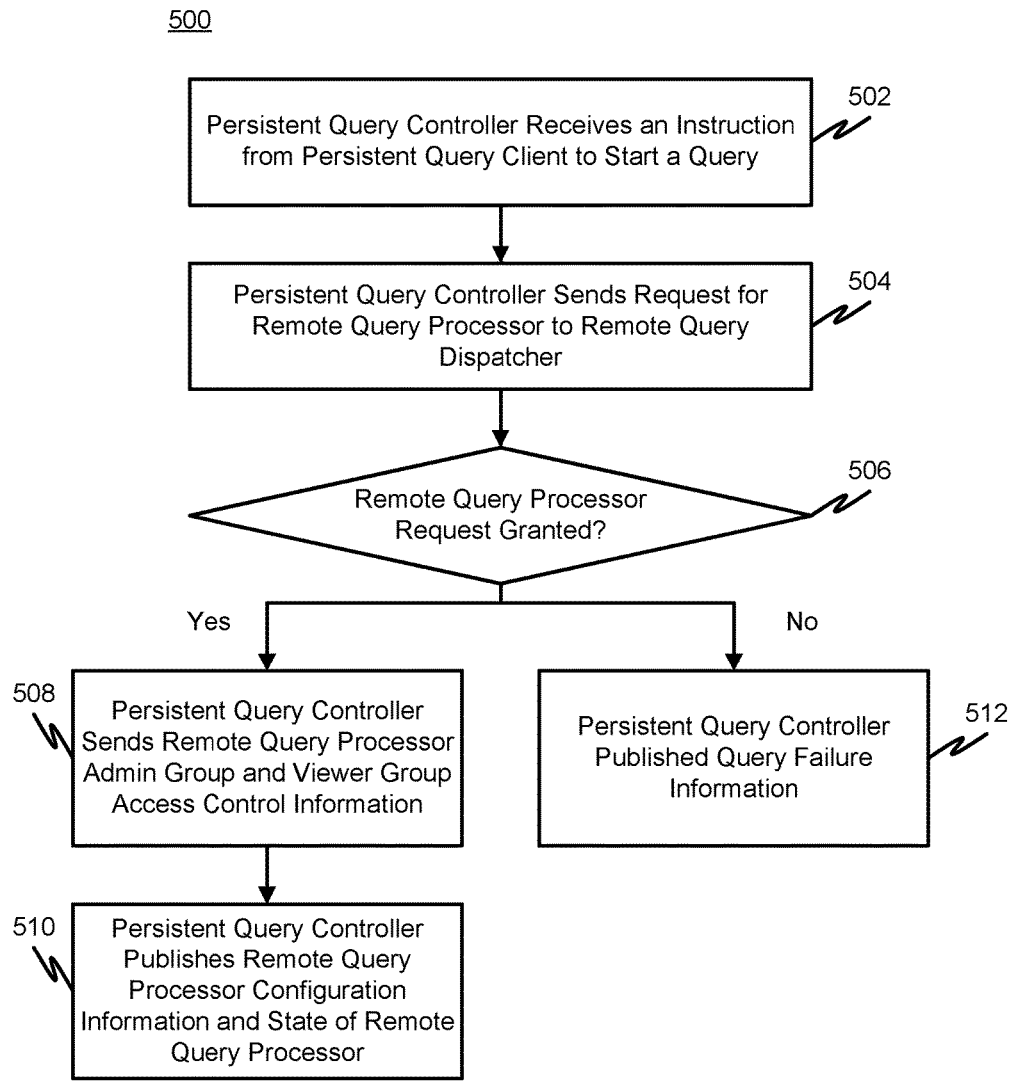
FIG. 5 is a flowchart of an example method of starting a persistent query in accordance with some implementations.
Figure 6:
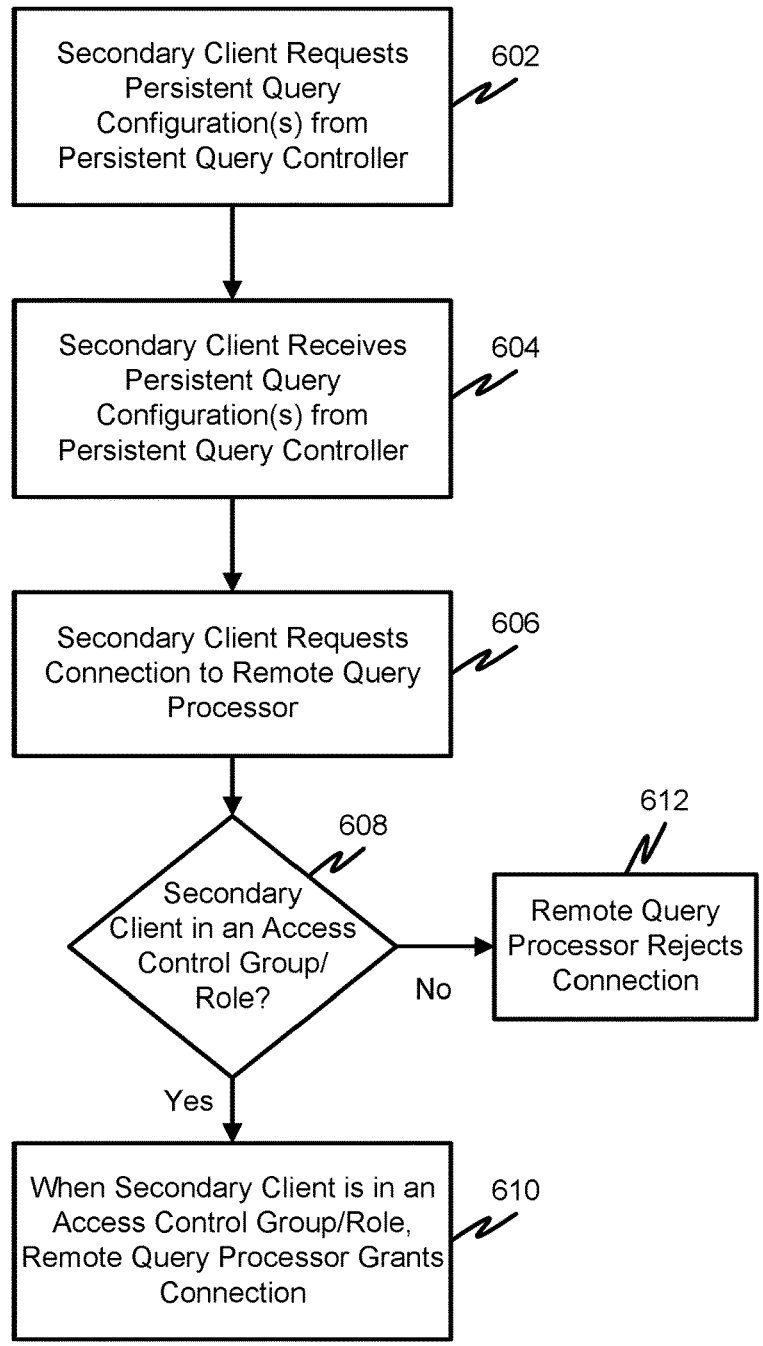
FIG. 6 is a flowchart of an example method of connecting a secondary client to a persistent query in accordance with some implementations.

In operation, secondary client 418 transmits data to and receives data from PQC 410 to, for example, transmit an instruction to PQC 410 to start a persistent query (e.g., as shown in FIG. 5) and/or receive persistent query configuration information to connect to the persistent query after it has been started on RQP 422 (e.g., as shown in FIG. 6). Primary client 416 of PQC 410 transmits data to and receives data from RQD 420 to, for example, request a RQP (RQP 422) for executing the persistent query, and RQD 420 transmits data to and receives data from RQP 422 to, for example, configure RQP 422 for the persistent query. Primary client 416 of PQC 410 connects to RQP 422 to start the persistent query. PQC 410 stores persistent query configuration information including a definition of the persistent query and access control 404. In some embodiments, the persistent query configuration information is stored in a map by PQC 410 (e.g., a persistent map). Secondary client 418 transmits data to and receives data from RQP 422 to, for example, connect to the persistent query after it has started (e.g., as shown in FIG. 6), and RQP 422 receives access control 404 information to determine whether to allow secondary client 418 to connect to the persistent query and/or perform operations with respect to the persistent query (e.g., start/stop/etc.).

Once connected to RQP 422, secondary client 418 can, based on the access control set for the query, perform various operations. For example, secondary client 418 can connect a GUI/console to the persistent query, and displaying the data involves a query task which returns the table to display. Optional access control filters are applied to the tables before they are returned to the user. If the GUI user wants to filter the dataset or otherwise massage it (e.g. Sym='AAPL', sort the data, etc.), the GUI can submit a query task to RQP 422 for only the desired data (i.e., a filter query task). The GUI can submit various query tasks to, for example, control how results of a persistent query are provided by RQP 422 (e.g., filter query tasks, sort tasks to sort the dataset, etc.) and/or select only a portion of the results (i.e., a subset including at least what is being displayed and/or what is used to generate what is being displayed by the GUI).

In another example, secondary client 418 can be a debugger GUI/console that connects to RQP 422 to debug running processes and execute on the remote process. In such embodiments, secondary client 418 can connect to RQP 422 as a debugger GUI/console to fetch variables/parameters of RQP 422 and execute queries or other commends (e.g., can execute on the RQP 422 from the console (i.e., command line) of the secondary client 418.

In another example, secondary client 418 can be a query task configured to retrieve consistent snapshots of an entire table, e.g., to save the current view to a CSV file.

In yet another example, secondary client 418 can be another RQP that connects to RQP 422 in order to retrieve a preemptive table, which allows query results to be shared among remote query processors. In such an example, a remote query processor with super-user privileges could provide an aggregated position table to one or more other remote query processors that may not have permission to access the source data required to generate the aggregated position table.

Access control information 404 is provided to RQP 422 by RQC 410 (e.g., on startup and optionally updated after startup) which indicates access control groups/roles for the persistent query (as discussed above) and RQP 422 then restricts access based on access control 404.

In some embodiments, PQC 410 acts as primary client 416 for persistent queries.

In some embodiments, if PQC 410 or primary client 416 goes down; then the query is stopped. In some such embodiments, a heartbeat is used to check whether PQC 410 or primary client 416 has gone down. The query definition remains in place in the stored persistent query configuration information (e.g., stored in the persisted map); and when PQC 410 or primary client 416 is restarted, the query can also be restarted. Any displayed results are recomputed on reinitialization (in general, it is possible to write things out and reload them; but that is not the common scheme).

Secondary client 418 can request a connection to a running RQP (e.g., RQP 422) (it is secondary because it is requesting and not starting). If the secondary client has sufficient permissions, it will be allowed to connect to the RQP, where it can see and interact with the state from the primary query. In some embodiments, secondary client 418 is a graphical user interface (GUI) for displaying output for the persistent query. The GUI connects to the existing RQP executing the persistent query (i.e., RQP 422 is concurrently used for connections by the primary client and secondary clients of that persistent query).

In some embodiments, the persistent query configuration information stored by PQC 410 includes a state of each persistent query (e.g. running, stopped, exception, etc.). In some embodiments, PQC 410 monitors the state each persistent query to prevent accidental duplicates if, for example, multiple requests to start the same persistent query are received.

In some embodiments, PQC 410 publishes persistent query configuration information and secondary connection 418 can receive the persistent query configuration information and automatically reconnect when a persistent query is restarted. In some such embodiments, when a persistent query is restarted; a brand new RQP is created. PQC 410 publishes information about the state of persistent queries in addition to publishing the contents of the stored (e.g., persistent) map. Clients (e.g., secondary client 418) receive the notifications, and if they have any display (e.g., GUI) that corresponds to the persistent query configuration that changed, the displayed results are updated (e.g., with a message saying the query is down or with the new contents of the table/widget via a connection to the new RQP that was created when the persistent query was restarted).

It will be appreciated that hosts 402, 406, and 408 can be the same or different (actual or virtual) servers. For example, in some embodiments, host 402 and host 408 can be executed on the same server, such as, for example, query server host 106 as shown in FIG. 1.

Although not show, some embodiments include more than one remote query dispatcher 420 executing on the same or different hosts (actual or virtual hosts), and a load balancer (e.g., one or more load balancers and/or a distributed load balancer). The load balancer could be implemented as a sub-module within each remote query dispatcher of the multiple dispatchers. This configuration could support a distributed system with each remote query dispatcher participating in a distributed state exchange and a single "leader" remote query dispatcher making scheduling decisions for all participating remote query dispatchers. The load balancer could also include a distributed 100% uptime load balancer. It will be appreciated that if a load balancer is included in an implementation, clients (primary client 416) may connect to the remote query dispatchers through the load balancer. When a load balancer is not included or is integrated within each remote query dispatcher, the clients (primary client 416) may connect directly to respective remote query dispatchers.

Although not show, some embodiments include more than one persistent query controller 410 executing on the same or different hosts (actual or virtual hosts), and a load balancer (e.g., one or more load balancers and/or a distributed load balancer). The load balancer could be implemented for the persistent query controllers in configurations similar to those discussed above with respect to the load balancer for the multiple remote query dispatchers.

It will be appreciated that the persistent query dispatch/execution architecture 400 is a simplified configuration for purposes of illustrating the principles of the disclosed subject matter. An actual implementation may include one or more clients, zero or more load balancers, one or more persistent query controllers, one or more remote query dispatchers and zero or more remote query processors associated with each remote query dispatcher.

FIG. 5 is a flowchart of an example method 500 of starting a persistent query in accordance with some implementations. Processing begins at 502, where a persistent query controller (PQC) (e.g., PQC 410 as shown in FIG. 4) receives an instruction from a persistent query client (e.g., host 406 or secondary client 418) to start a persistent query. Processing continues to 504.

At 504, the PQC sends a request for a remote query processor (RQP) (e.g., RQP 422) to a remote query dispatcher (RQD) (e.g., RQD 420). The PQC can start a primary client (e.g. 416) for communicating with the RQD/RQP. The request can be sent to the RQD via an optional load balancer (as described above). In some embodiments, the PQC can use one primary client for connecting to multiple RQPs. Processing continues to 506.

At 506, it is determined whether the RQP request was granted. If it was granted, then processing continues to 508; otherwise processing continues to 512.

At 508, the PQC sends RQP access control information that can include admin/viewer groups (e.g., admin groups 412 and viewer groups 414 of access control 404) and/or other access control roles (e.g., superuser, supervisor, etc., as discussed above). Processing continues to 510.

At 510, the PQC publishes RQP configuration information and state of RQP, The state information can include: the current life cycle of the query (authenticating, initializing, running, stopped, error after initialize, failed to initialize); what RQP host/port was assigned; and also the sufficient data to display the query configuration panel in the GUI client (e.g., table names, widget names, and possibly the groups allowed to access each table/widget). Other summary information can be published to augment the query configuration panel and prevent the need to connect to individual RQP simply to display the configuration panel.

At 512, the PQC publishes query failure information. The query failure information can include an indication that the query failed. In addition, the query failure information can include error messages, exception messages, and/or other data (e.g., stack traces, variables, etc.) which may enable debugging the underlying problem. For example, the RQP and/or RQD can be configured to detect errors (e.g., catch exceptions) related to the execution of the persistent query and publish such errors.

It will also be appreciated that 502-512 may be repeated in whole or in part to, for example, automatically retry starting the query if the RQP request is not granted.

FIG. 6 is a flowchart of an example method 600 of connecting a secondary client to a persistent query in accordance with some implementations. Processing begins at 602, where a secondary client (e.g., secondary client 418 as shown in FIG. 4) requests persistent query configuration(s) from a persistent query controller (PQC) (e.g., PQC 410), In some embodiments, the secondary client can request configuration information from the PQC for one or more particular queries. Additionally or alternatively, the PQC can publish available persistent query configurations. Processing continues to 604.

At 604, the secondary client receives persistent query configuration(s) from the PQC. The secondary client can receive configurations for those requested at 602, and/or available configurations published by the PQC. In some embodiments, the PQC sends/publishes valid configurations that the secondary client has access to. A persistent query configuration for a persistent query of the PQC can include: unique serial ID, name, remote query processor (RQP) ID, host and port information.

In some embodiments, 602 is omitted and the secondary client receives persistent query configuration(s) without requesting the configuration(s) from the PQC at 602 (e.g., by receiving configuration(s) published by the PQC, by manual user input, or by some other method), and In some embodiments in which the secondary client is a GUI, the name can be used display purposes and the unique serial ID can be used to retrieve information about the query and stored in a user's workspace for saving the appropriate views across runs of the client code. For example, persistent queries can run each day, and GUI users may want to view the same results each day with particular filtering and sort combinations applied, in a specific layout. To enable users to save the layout, a serial ID can be associated with each query, and when a user saves their workspace: for each view, the serial ID of the query and the name of the table/widget that the view contains is recorded. The name/owner of the query can then be changed for administrative reasons without disconnecting it from the user's workspaces. Processing continues to 606.

At 606, the secondary client requests connection to a RQP. Processing continues to 608.

At 608, the RQP checks the access control groups/roles for secondary client. The access control groups can be set in access control information (e.g., access control 404) and can include access control groups/roles including admin, viewer and other groups/roles (as discussed above). The RQP can check the access control groups for the presence of the user authenticated on the secondary client. Additionally or alternatively, the RQP can check the network address and/or other identifier of the secondary client (e.g., IP address, digital certificate or other encryption credentials, etc.) against those set in the access control groups/roles. If secondary client is in an access control group/role, processing continues to 610. Otherwise, processing continues to 612, where the RQP rejects the connection from the secondary client.

At 610, when the secondary client is in an access control group/role, the RQP grants the connection. The RQP can grant the connection when the user of the secondary client is in one of the access control groups/roles.

It will be appreciated that 602-610 may be repeated in whole or in part. For example, 606-610 may be repeated to connect to multiple RQPs. In another example, 602-610 and/or 604-610 may be repeated to connect to RQPs as new persistent query configuration(s) become available (e.g., are requested by the secondary client and/or published by the PQC).

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), a graphics processing unit (e.g., GPGPU or GPU) or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, GP, GPU, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for persistent query dispatch and execution architecture.

application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

application Ser. No. 15/154,998, entitled "DYNAMIC CODE LOADING" and filed in the United States Patent and Trademark Office on May 14, 2016, is hereby incorporated by reference herein in its entirety as if fully set forth herein.

application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer data system having a persistent query dispatch and execution architecture, the system comprising:
   one or more processors each being a hardware processor;
   computer readable storage coupled to the one or more processors, the computer readable storage having stored thereon instructions that, when executed by the one or more processors, cause the one or more processors to perform operations including:
   sending an electronic request for a remote query processor from a persistent query controller to a remote query dispatcher executing on a query server computer, wherein the request includes parameters for configuring the remote query processor and an operating environment for the remote query processor, the parameters including a parameter selected from the group consisting of:
      a shell variable to be set on the operating environment for the remote query processor, and
      a classpath specifying a location of code to be used by the remote query processor;
   attempting, at the remote query dispatcher, to allocate an isolated operating environment for the remote query processor and to start execution of the remote query processor on the query server computer;

when the remote query processor is started, performing operations including:
  providing the persistent query controller with an address assignment of the remote query processor or of a proxy machine in communication with the remote query processor, the address assignment identifying a specific address of the query server computer or of the proxy machine available to connect electronically over an electronic communications network;
  automatically connecting from the persistent query controller to the remote query processor via the electronic communications network;
  transmitting a persistent database query electronically from the persistent query controller to the remote query processor;
  publishing persistent database query configuration information including a state of the persistent database query and the address assignment of the remote query processor;
  connecting from a client to the remote query processor via the electronic communications network;
  executing the persistent database query;
  after the executing the persistent database query has started, receiving, from a second client different than the client, an instruction to the persistent query controller to modify code executed for the persistent database query;
  determining whether to allow the connection by the client to the remote query processor based on access control information specific to the persistent database query; and
  when the connection by the client is allowed:
  sending a request to perform an administrative operation with respect to the persistent database query from the client to the persistent query controller, the administrative operation being an instruction to modify one or more of the parameters for configuring the remote query processor and the operating environment for the remote query processor, and
  determining whether the client is authorized to perform the administrative operation based on the access control information.

2. The system of claim 1, wherein the operations further comprise:
  when the connection by the client is allowed:
    receiving at the client at least a portion of a current result of the persistent database query from the remote query processor.

3. The system of claim 1, wherein the operations further comprise:
  when the connection by the client is allowed:
    filtering, based on access control information, a current result of the persistent database query requested by the client from the remote query processor; and
    sending at least a portion of the filtered current result of the persistent database query to the client.

4. The system of claim 1, wherein the operations further comprise:
  sending, from the second client different than the client, an instruction to the persistent query controller to start, stop, restart, modify parameters, or modify code of the persistent database query.

5. The system of claim 1, wherein the operations further include:
  when the connection by the client is allowed:
    receiving a result of the persistent database query at the client;
    displaying at least a portion of the result at the client via a graphical user interface and/or a console;
    receiving at least a portion of an updated result of the persistent database query from the remote query processor; and
    responsive to the receiving the at least a portion of the updated result, updating the graphical user interface and/or console to display the at least a portion of the updated result.

6. The system of claim 1, wherein the client is another remote query processor.

7. The system of claim 1, wherein the operations further include:
  determining whether the remote query processor rejects the request for a remote query processor from the persistent query controller;
  when the remote query dispatcher rejects the request, publishing an indication of the rejection;
  detecting, by the remote query processor or remote query dispatcher, an error in the execution of the persistent database query; and
  when the remote query processor or remote query dispatcher detects an error in the execution of the persistent database query, publishing an indication of the error.

8. The system of claim 1, wherein the operations further include:
  when the connection by the client is allowed:
    transmitting an additional query task electronically from the client to the remote query processor;
    executing, at the remote query processor, the additional query task; and
    receiving at least a portion of a result of the additional query task at the client.

9. The system of claim 1, wherein the operations further include:
  periodically providing a liveness indication from the persistent query controller to the remote query dispatcher, and
  when the liveness indication is not received after a limited amount of time, stopping the remote query processor.

10. A method for improving performance of a computer data system through control of a persistent query dispatch and execution architecture, the method comprising:
  sending an electronic request for a remote query processor from a persistent query controller to a remote query dispatcher executing on a query server computer, wherein the request includes parameters for configuring the remote query processor and an operating environment for the remote query processor, the parameters including a parameter selected from the group consisting of:
    a shell variable to be set on the operating environment for the remote query processor, and
    a classpath specifying a location of code to be used by the remote query processor;
  automatically attempting, at the remote query dispatcher, to allocate an isolated operating environment for the remote query processor and to prepare the remote query processor on the query server computer;
  when the remote query processor is prepared, performing operations including:
    providing the persistent query controller with an address assignment of the remote query processor or of a proxy machine in communication with the remote query processor, the address assignment identifying a specific address of the query server computer or of the proxy machine available to connect electronically over an electronic communications network;

automatically connecting from the persistent query controller to the remote query processor via the electronic communications network;

transmitting a persistent database query electronically from the persistent query controller to the remote query processor;

publishing persistent database query configuration information including a state of the persistent database query and the address assignment of the remote query processor;

connecting from a client to the remote query processor via the electronic communications network;

executing the persistent database query;

after the executing the persistent database query has started, receiving, from a second client different than the client, an instruction to the persistent query controller to modify code executed for the persistent database query;

determining whether to allow the connection by the client to the remote query processor based on access control information specific to the persistent database query; and when the connection by the client is allowed:
sending a request to perform an administrative operation with respect to the persistent database query from the client to the persistent query controller, the administrative operation being an instruction to modify one or more of the parameters for configuring the remote query processor and the operating environment for the remote query processor, and determining whether the client is authorized to perform the administrative operation based on the access control information.

11. The method of claim 10, further comprising:
when the connection by the client is allowed:
receiving at the client at least a portion of a current result of the persistent database query from the remote query processor.

12. The method of claim 10, wherein the operations further comprise:
when the connection by the client is allowed:
filtering, based on access control information, a current result of the persistent database query requested by the client from the remote query processor; and
sending at least a portion of the filtered current result of the persistent database query to the client.

13. The method of claim 10, further comprising:
sending, from the second client different than the client, an instruction to the persistent query controller to start, stop, or restart the persistent database query.

14. The method of claim 10, further comprising:
when the connection by the client is allowed:
receiving a result of the persistent database query at the client;
displaying at least a portion of the result at the client via a graphical user interface and/or a console;
receiving at least a portion of an updated result of the persistent database query from the remote query processor; and responsive to the receiving the at least a portion of the updated result, updating the graphical user interface and/or console to display the at least a portion of the updated result.

15. The method of claim 10, wherein the client is another remote query processor.

16. The method of claim 10, further comprising:
determining whether the remote query processor rejects the request for a remote query processor from the persistent query controller;
when the remote query dispatcher rejects the request, publishing an indication of the rejection;
detecting, by the remote query processor or remote query dispatcher, an error in the execution of the persistent database query; and
when the remote query processor or remote query dispatcher detects an error in the execution of the persistent database query, publishing an indication of the error.

17. The method of claim 10, further comprising:
when the connection by the client is allowed:
transmitting an additional query task electronically from the client to the remote query processor;
executing, at the remote query processor, the additional query task; and
receiving at least a portion of a result of the additional query task at the client.

18. The method of claim 10, further comprising:
periodically providing a liveness indication from the persistent query controller to the remote query dispatcher, and
when the liveness indication is not received after a limited amount of time, stopping the remote query processor.

19. A nontransitory computer readable medium having stored thereon software instructions that, when executed by one or more processors, cause the processors to perform operations including:
sending an electronic request for a remote query processor from a persistent query controller to a remote query dispatcher executing on a query server computer, wherein the request includes parameters for configuring the remote query processor and an operating environment for the remote query processor, the parameters including a parameter selected from the group consisting of:
a shell variable to be set on the operating environment for the remote query processor, and
a classpath specifying a location of code to be used by the remote query processor;
automatically attempting, at the remote query dispatcher, to allocate an isolated operating environment for the remote query processor and to run-o€ the remote query processor on the query server computer;
when the remote query processor is running, performing operations including:
providing the persistent query controller with an address assignment of the remote query processor or of a proxy machine in communication with the remote query processor, the address assignment identifying a specific address of the query server computer or of the proxy machine available to connect electronically over an electronic communications network;
automatically connecting from the persistent query controller to the remote query processor via the electronic communications network;

transmitting a persistent database query electronically from the persistent query controller to the remote query processor;

publishing persistent database query configuration information including a state of the persistent database query and the address assignment of the remote query processor;

connecting from a client to the remote query processor via the electronic communications network;

executing the persistent database query;

after the executing the persistent database query has started, receiving, from a second client different than the client, an instruction to the persistent query controller to modify code executed for the persistent database query;

determining whether to allow the connection by the client to the remote query processor based on access control information specific to the persistent database query; and when the connection by the client is allowed:

sending a request to perform an administrative operation with respect to the persistent database query from the client to the persistent query controller, the administrative operation being an instruction to modify one or more of the parameters for configuring the remote query processor and the operating environment for the remote query processor, and determining whether the client is authorized to perform the administrative operation based on the access control information.

20. The computer readable medium of claim 19, wherein the operations further comprise:

when the connection by the client is allowed:
receiving at the client at least a portion of a current result of the persistent database query from the remote query processor.

21. The computer readable medium of claim 19, wherein the operations further comprise:

when the connection by the client is allowed:
filtering, based on access control information, a current result of the persistent database query requested by the client from the remote query processor; and
sending at least a portion of the filtered current result of the persistent database query to the client.

22. The computer readable medium of claim 19, wherein the operations further comprise:

sending, from the second client different than the client, an instruction to the persistent query controller to start, stop, or restart the persistent database query.

23. The computer readable medium of claim 19, wherein the operations further include:

when the connection by the client is allowed:
receiving a result of the persistent database query at the client;
displaying at least a portion of the result at the client via a graphical user interface and/or a console;
receiving at least a portion of an updated result of the persistent database query from the remote query processor; and
responsive to the receiving the at least a portion of the updated result, updating the graphical user interface and/or console to display the at least a portion of the updated result.

24. The computer readable medium of claim 19, wherein the client is another remote query processor.

25. The computer readable medium of claim 19, wherein the operations further include:

determining whether the remote query processor rejects the request for a remote query processor from the persistent query controller;
when the remote query dispatcher rejects the request, publishing an indication of the rejection;
detecting, by the remote query processor or remote query dispatcher, an error in the execution of the persistent database query; and
when the remote query processor or remote query dispatcher detects an error in the execution of the persistent database query, publishing an indication of the error.

26. The computer readable medium of claim 19, wherein the operations further include:

determining whether the attempting to start a remote query processor was successful; and
when the attempting was not successful, repeating the attempting a limited number of times.

27. The computer readable medium of claim 19, wherein the operations further include:

periodically providing a liveness indication from the persistent query controller to the remote query dispatcher, and
when the liveness indication is not received after a limited amount of time, stopping the remote query processor.

* * * * *

UNITED STATES PATENT AND TRADEMARK OFFICE
CERTIFICATE OF CORRECTION

Page 1 of 1

PATENT NO. : 10,212,257 B2
APPLICATION NO. : 15/155005
DATED : February 19, 2019
INVENTOR(S) : David R. Kent, IV et al.

It is certified that error appears in the above-identified patent and that said Letters Patent is hereby corrected as shown below:

On the Title Page

(72) Inventors should be corrected to read:
David R. Kent, IV, Colorado Springs, CO (US);
Ryan Caudy, New York, NY (US); Charles Wright, Cortlandt Manor, NY (US); Nathaniel Dorfman, Sandy, UT (US); Brian Ries, St. Louis Park, MN (US); Radu Teodorescu, New York, NY (US)

In the Claims

In Column 20, Line 53, in Claim 19, delete "to run-of the" and insert --to run the--

Signed and Sealed this
Twenty-seventh Day of August, 2019

Andrei Iancu
*Director of the United States Patent and Trademark Office*